March 14, 1933.   L. A. BOND   1,901,431
METHOD OF AND APPARATUS FOR DETERMINING TRUE
ROCK TEMPERATURE IN ROTARY DRILLED WELLS
Filed Sept. 22, 1928   2 Sheets-Sheet 2
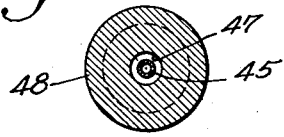
Fig. 5.
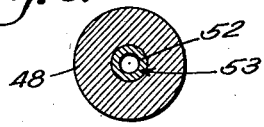
Fig. 6.
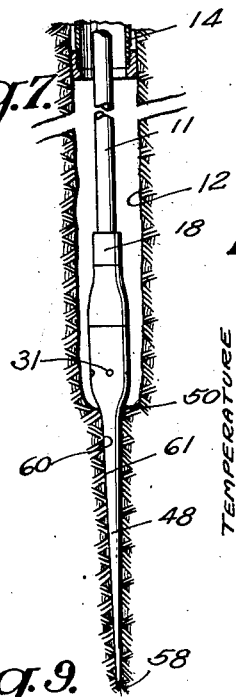
Fig. 7.
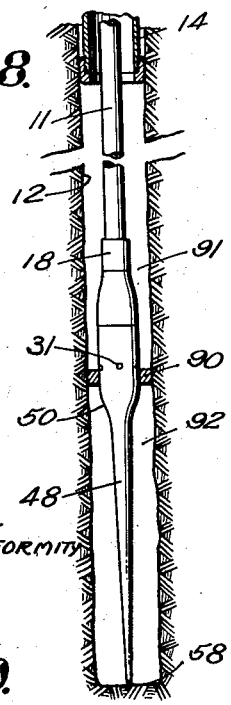
Fig. 8.
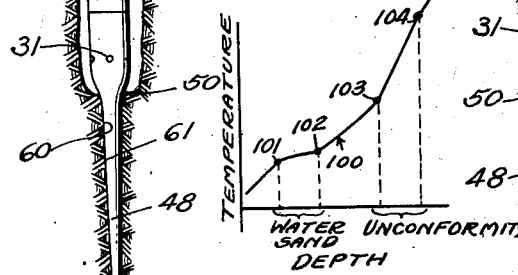
Fig. 11.
Fig. 9.   Fig. 10.
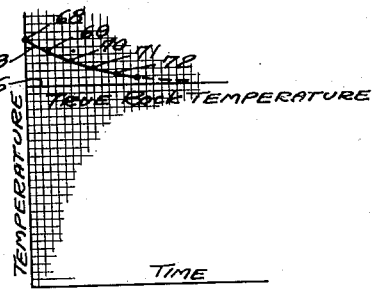
INVENTOR:
Lewis A. Bond;
By
ATTORNEY.

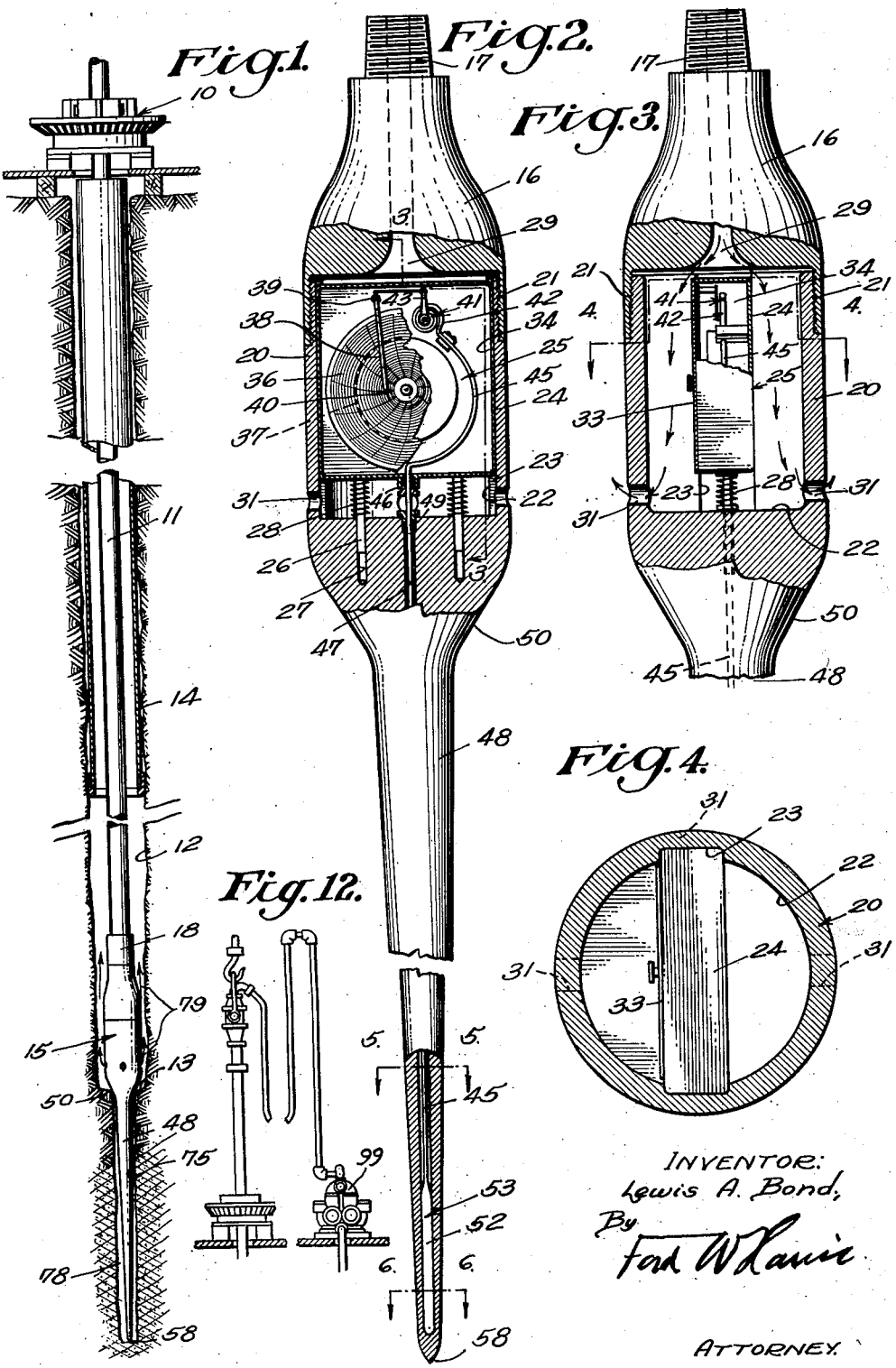

Patented Mar. 14, 1933

1,901,431

UNITED STATES PATENT OFFICE

LEWIS A. BOND, OF LOS ANGELES, CALIFORNIA, ASSIGNOR TO SHELL OIL COMPANY, OF SAN FRANCISCO, CALIFORNIA, A CORPORATION OF CALIFORNIA

METHOD OF AND APPARATUS FOR DETERMINING TRUE ROCK TEMPERATURE IN ROTARY DRILLED WELLS

Application filed September 22, 1928. Serial No. 307,621.

My invention relates to a novel method of and apparatus for accurately determining rock temperatures in a well.

The position of large underground bodies of petroleum is largely determined by structural conditions of the surrounding strata. Thus, if the geological structure of these strata may be determined, it is possible to predict the position of such bodies of oil.

One method of thus securing data of the geological strata is, of course, to study and measure outcrops of strata appearing in the locality. Another method is to keep an accurate record of the types of strata found at different levels in a number of wells being drilled in the same field.

Of late it has become known that certain types of geologic structure and distinctive lithologic and geologic features may be identified by accurately determining the temperatures at different depths during the drilling of a well. It appears that a more or less systematic relationship exists between the geothermal gradient which may be thus determined and the geologic structure at this particular point.

In general the geothermal gradient appears to be abnormally steepened above structural uplifts. In other words, if an accurate curve of temperature against depth is plotted for a number of wells, those wells having the steepest curves indicate the presence of a structural uplift, for example, an anticlinal fold, thereadjacent. Furthermore, the geothermal gradient is influenced more or less characteristically by such factors as the petrologic character of the strata and by their fluid content, by the presence of strata such as organic sediments which are evolving heat and by disconformities or unconformities between successive formations. Knowledge of such features may be of value in the mechanical handling of a given well, and when compared with results from neighboring wells may be of great service in the difficult work of making geological correlations between wells in the absence of distinctive "marker" beds.

It is an object of this invention to provide a novel method and apparatus for accurately determining rock temperatures in a well.

It is an object of this invention to provide a method of determining the existence of certain types of geologic formations encountered during the drilling of a well by noting identifiable peculiarities in the depth-temperature curve.

Another object of this invention is to provide a method of determining the placement of certain types of strata underlying a relatively large area by noting identifiable peculiarities in the depth-temperature curves of a plurality of wells drilled in this area.

Heretofore, the accurate determination of rock temperatures in a well which is being drilled by the rotary method has been practically impossible, due to the prohibitive time which elapses before an equilibrium is reached after drilling has been stopped. This may best be understood by considering the action that takes place when a well is being drilled by this method.

In rotary drilling, a suitable bit is secured to the lower end of a string of drill-pipe, this string of drill-pipe being rotated from the surface of the ground by a suitable rotary machine. A fluid, usually in the form of mud, is forced downward through the drill-pipe for four purposes; first, to lubricate or aid the cutting action of the bit; second, to carry upward the cuttings chipped off by the bit; third, to maintain a fluid-pressure in the well which prevents the collapse of the walls of the well; and, fourth, to prevent any danger of the string of drill-pipe "freezing", by being surrounded by sand or cuttings in a manner to make it difficult to withdraw the bit from the well.

A large amount of heat is ordinarily generated by the abrasive action between the bit and the structure being penetrated. This heat is absorbed by the flow of mud, this mud being usually at a temperature substantially atmospheric.

Due to the fact that the temperature of a bore ordinarily increases with depth, this mud also absorbs heat from the surrounding strata of the well, thus disturbing the equilibrium which was present in these strata before penetration thereof by the bit. It has been found that the disturbances in rock temperature produced by this flow of mud are very pronounced, and it has been further found that the normal thermal equilibrium is regained very slowly after the cessation of drilling. Tests in abandoned wells seem to indicate that a period of months is generally required for the complete elimination of the disturbances of rock temperature brought about during the drilling of the well.

Previous attempts to accurately determine rock temperatures in a rotary drilled well have been unsuccessful and impractical, due to the long shut-down heretofore necessary to secure an accurate determination of the rock temperature, and also due to the danger to the well when the flow of mud therethrough is checked, this stoppage of mud-flow being heretofore necessary in order that the instrument for recording temperatures be not influenced by the temperature of the mud.

In drilling through favorable formations where the rate of progress of the bit is rapid, the thermal disturbance due to the drilling does not proceed far in advance of the bit itself. Thus, by lowering a suitable heat-sensitive element to a point below that previously occupied by the bit, it is possible to accurately determine the rock temperature at this point without an undue loss of time in waiting for the equilibrium conditions to be regained.

It is an object of this invention to provide a method of testing rock temperatures by inserting a heat-sensitive element into the strata at the lower portion of the well and at a depth somewhat greater than that penetrated by the bit drilling the well.

In order that there be no danger of the drill-pipe "freezing", or of the walls of the well caving, I force a stream of mud downward through the drill-pipe, this mud exerting a pressure on the strata and preventing any "freezing".

It is an object of this invention to provide a heat-sensitive element positioned in the lower part of a well and sealed in a chamber so that no fluid foreign to the well may enter this chamber.

It is a further object of this invention to provide a rock temperature-indicating device, the readings of which are not affected by a flow of fluid maintained through the well.

I have found it desirable to utilize a recording thermometer for recording the temperatures measured during a desired time. A curve of temperature many thus be plotted against time, this curve being asymptotic to the true rock temperature, so that it is not necessary to hold the thermometer in the bottom of the well over an extended period of time, due to the fact that the true rock temperature may be extrapolated therefrom.

It is thus an object of this invention to provide a method of determining rock temperatures which includes recording successive temperatures before equilibrium has been reached, and determining the true rock temperature therefrom by extrapolation.

Still a further object of this invention is to provide a novel method of drilling a well by balancing the amount of mud forced downward therein against the heat developed by the bit, thus lessening as much as possible the penetration of temperature disturbances due to drilling.

Further objects and advantages of my invention will be made evident hereinafter.

Referring to the drawings in which I illustrate a preferred embodiment of my apparatus, together with several methods of using same,—

Fig. 1 is a utility view illustrating one method of my invention.

Fig. 2 is a view, partially sectioned, illustrating the apparatus of my invention.

Fig. 3 is a fragmentary view, partially broken away, taken on the line 3—3 of Fig. 2.

Fig. 4 is a sectional view taken on the line 4—4 of Fig. 3.

Fig. 5 is a sectional view taken on the line 5—5 of Fig. 2.

Fig. 6 is a sectional view taken on the line 6—6 of Fig. 2.

Fig. 7 is a utility view illustrating one method of utilizing my invention.

Fig. 8 is still another utility view illustrating a third method of utilizing my invention.

Figs. 9 and 10 illustrate two types of curves which may be plotted from the readings indicated by my apparatus.

Fig. 11 illustrates one type of depth-temperature curve and the information which may be deduced therefrom.

Fig. 12 is a view showing the means at the top of the well for forcing fluid down the drill-pipe.

Referring particularly to Fig. 1, I have illustrated a portion of a rotary machine 10 normally utilized for turning a string of drill-pipe 11 to the lower end of which a bit is connected in a manner to form a bore-hole 12 in the ground. The lowest depth to which the drill has penetrated in Fig. 1 is indicated by a shelf 13. A well-casing 14 may be set in the bore-hole 12 as drilling progresses.

My invention comprises a geothermometer 15 which may be attached to the lower end of the drill-pipe 11 and lowered into the bore-hole by a suitable travelling-block secured to the drill-pipe above the rotary machine 10.

The details of my invention may be best understood by reference to Figs. 2 and 3 in which I have illustrated a head 16 having a threaded pin 17 adapted to be received by a tool-joint 18 secured to the lower end of the drill-pipe. The head 16 is suitably secured to the upper end of a body 20 by any suitable means such as threads 21.

The body 20 provides a substantially circular cavity 22, the upper end of which is defined by the head 16. Channels 23 are formed in opposite walls of the cavity 22, these channels being adapted to retain a shell 24 of a temperature-recording device 25. The channel 23 is so formed that the shell 24 may move vertically therein, this shell having pins 26 extending downward therefrom and into guide holes 27 formed in the body 20. Surrounding each of the pins 26 is a spring 28 which supports the shell 24, these springs acting as shock absorbers for the shell 24 and the recording device 25 therein.

The cavity 22 is in communication with the interior of the drill-pipe 11 by a channel 29 formed through the head 16 so that a fluid in the form of rotary mud may be forced downward through the drill-pipe 11 by any suitable means at the surface of the ground, this mud entering the cavity 22 and filling the space around the shell 24. This mud may escape into the well through a series of openings 31 formed through the walls of the body 20 to communicate with the cavity 22.

The shell 24 includes a suitable cover 33 which defines a fluid-tight chamber 34 inside the shell 24. It is in this chamber that the temperature-recording mechanism is positioned. The details of this recording device are, in themselves, not a part of this invention. I prefer to use a time-operated recording mechanism, one form of which is illustrated in the drawings. This type of recording mechanism includes a chart 36 which is rotated by clockwork indicated by the numeral 37. An arm 38 is pivoted at 39 and has a pin 40 which bears against the chart 36. The position of the arm 38 relative to the chart is determined by a mechanism 41 which, in the particular type of recording device illustrated, comprises a spiral tube 42, the inner end of which is sealed and mechanically connected by a linkage 43 to the arm 38 in a well-known manner. The outer end of the spiral tube 42 is in communication with a capillary tube 45 which extends from the shell 24 through a stuffing box 46, and through a bore 47 formed through the lower end of the body 20, and through a prod 48 formed integrally with this body and extending a distance therebelow.

A stuffing box 49 is provided at the point where the capillary tube 45 enters the bore 47.

As best illustrated in Figs. 1 and 2, the prod 48 is tapered, the largest diameter thereof being substantially less than the outer diameter of the body 20 so as to form a shoulder 50 which may be used as a sealing means in a manner to be subsequently described.

The bore 47 extends downward through the prod 48, the lower end of this bore holding a bulb 52 which is welded to, or formed integral with, the lower end of the capillary tube 45, this bulb forming a heat-sensitive element 53. The spiral tube 42, the capillary tube 45, and the bulb 52 are preferably filled with a fluid having a material coefficient of expansion. The fluid ordinarily used is mercury, and as the heat-sensitive element 53 is subjected to rising temperatures, this mercury increases in volume, thus increasing the pressure throughout the capillary tube 45 and in the spiral tube 42 in a manner to cause the arm 38 to register the exact temperature on the chart 36. Due to the fact that the chart 36 is driven by clockwork, the change in temperature to which the heat-sensitive element 53 is subjected will cause a graph to be drawn on the chart 36, this graph being subsequently useful in determining the exact temperature of the heat-sensitive element 53 at any given time.

Three very convenient methods of utilizing my geothermometer are possible, depending upon conditions existing in the well. The first of these methods is illustrated in Fig. 7, in which the strata being penetrated by the bit in forming the bore-hole 12 are soft enough to allow a penetration thereof by the prod forced downward by the weight of the drill-pipe and by its own weight. In this event the progress of the bit therethrough is ordinarily rapid, and the disturbances in rock temperature equilibrium do not proceed far in advance of the bit itself. Such disturbances, as previously explained, are caused by the friction-heat developed by the bit on the strata and by the cooling action of the mud which is being forced through the drill-pipe 11 during the drilling of the bore-hole 12. It stands to reason, that where the progress of the bit is very slow a large period of time will elapse during which the disturbances in equilibrium may penetrate to relatively great depths of the strata.

However, if the strata are soft and drilling progress is rapid, this penetration will not be extremely great. In this event, the accurate determination of the rock temperature includes the withdrawing of the drill-pipe 11 and bit, and attaching the geothermometer 15 to the lower end of the drill-pipe after which this drill-pipe is again lowered in the bore-hole until a point 58 of the prod 48 comes in contact with the shelf 13 formed at the lowest position to which bit penetrated.

The drill-pipe 11 is then lowered a distance substantially equal to the combined length of the prod 48 and a heat-sensitive element 53, so that these elements penetrate the formation below the shelf 13 in a manner indicated in Fig. 7, thus forming what I have termed a "core-hole" 60 in the strata below the shelf 13, this core-hole providing a chamber 61 into which the prod and heat-sensitive element tightly fit.

Due to the fact that the prod and heat-sensitive element are relatively long, this heat-sensitive element will be positioned a material distance below the shelf 13 so as to move near, or beyond, the total distance of penetration of the thermal disturbance due to the drilling.

The geothermometer 15 is kept in the lower portion of the well for a material length of time, depending upon the type of formation, the depth of thermal disturbance due to drilling, etc. When the geothermometer is raised to the surface, the chart 36 will have a graph thereon indicating the temperatures to which the heat-sensitive element was subjected during lowering, and during the time that it rested in the chamber 61 formed by the core-hole 60. The clockwork 37 is, of course, synchronous with a clockwork at the surface of the ground so that the operator may determine the exact point on the chart 36 at which the heat-sensitive element 53 reached its maximum penetration. The temperature at this instant may be read from the chart 36 and plotted on a time-temperature coordinate system such as indicated in Figs. 9 and 10.

In the event that the heat developed by the friction of the bit is totally absorbed by the mud, this mud may still be cool enough to have a decided cooling effect upon the strata through which the bore-hole passes. Thus, heat will be absorbed from these strata, and ordinarily a material length of time must elapse in order that the subterranean heat again reach the state of equilibrium. Thus, the temperatures recorded on the chart 36 will successively rise with time as this subterranean heat tends to reach an equilibrium.

In Fig. 9, I have illustrated a curve of these temperatures plotted against time, the numeral 62 indicating the initial reading when the heat-sensitive element was first lowered completely into the chamber 61, and the subsequent readings 63, 64, and 65 being temperatures recorded at later times during the time that the heat-sensitive element was in this chamber. The point 65 indicates the time at which the geothermometer was raised. By plotting the points 62 to 65 as indicated in Fig. 9, a smooth curve may be drawn therethrough, this curve being asymptotic to a line 66 indicating the true rock temperature. The position of this line 66 may be determined by extrapolation, so that it is not necessary to keep the heat-sensitive element in the chamber 60 until absolute equilibrium has been reached.

In the event that the frictional heat developed by the drill is more than can be absorbed by the flow of mud, it follows that the temperature of the strata around the bore-hole will be increased during the drilling operation. In this event, the first reading of the geothermometer would be at a point indicated by the numeral 68 of Fig. 10 and subsequent readings 69, 70, 71, and 72 will determine a curve 73 which is also asymptotic to the line 66 indicated in the true rock temperature. This latter case is seldom met in the drilling art.

In the event that the rock formations through which the drill is passing are too hard to be readily penetrated by the prod, the procedure above outlined must be varied somewhat, and in Fig. 1 I have illustrated a method whereby the rock temperatures of such a well may be determined.

To meet this situation, I prefer to drill or otherwise form a core-hole 75 in the strata immediately below the shelf 13 of the bore-hole 12. The diameter of the core-hole is ordinarily less than that of the bore-hole, but is preferably slightly larger than the prod 48 so that this prod may easily fit therein, the depth of the bore-hole being sufficient to contain preferably the whole length of the prod. However, if a smaller core-hole is utilized, the prod may be lowered until the diameter of the core-hole equals the diameter of the prod.

The walls of the core-hole 75 define a chamber 78 which corresponds to the chamber 60 shown in Fig. 7. It is preferable at all times to have this chamber sealed from the bore-hole 12. In Fig. 7 this is accomplished by the surface contact between the prod and the strata. In Fig. 1 it is accomplished by a sealing engagement between the shelf 13 and the shoulder 50 of the body 20, or by any portion of the prod 48 which engages the upper walls of the core-hole 75. The chamber 78 is thus effectively sealed from the bore-hole 12 so that with the apparatus illustrated in either Figs. 1 or 7 a stream of fluid in the form of rotary mud may be forced downward through the drill-pipe 11, in the usual manner by the pump 99 shown in Fig. 12, through the passage 29 and the cavity 22, this mud passing through the openings 31 and rising around the body 20 and drill-pipe 11, as indicated by arrows 79 of Fig. 1.

This circulation of mud is very desirable inasmuch as the pressure thereof prevents the caving of the bore-hole 12 and prevents a "freezing" of the drill-pipe 11. It should be noticed that due to the sealing means provided by the shoulder 50 and the shelf 13 none of this fluid enters the chamber 78 to disturb the equilibrium of the rock temperatures.

During the drilling of this core-hole the rate of mud circulation is empirically adjusted to the nature of the drilling so as to minimize thermal disturbance as will be hereinafter described.

The method of plotting a time-temperature curve from the readings recorded on the chart 36 is the same as previously described, this curve being asymptotic with the true rock temperature.

In Fig. 8 I have illustrated another method of determining the true rock temperature in which no core-hole is drilled at the bottom of the bore-hole 12. In this method, I provide the body 20 with a packer 90 which engages the walls of the bore-hole 12, thus forming this bore-hole into an upper chamber 91 and a lower chamber 92, the former extending to the surface of the ground, while the latter chamber corresponds in function to the chambers 60 and 78 previously described. Mud may be circulated as previously described, the packer 90 acting as a sealing means to prevent any flow of this mud into the chamber 92. The temperature in this lower chamber 92 thus is the same as the temperature surrounding the strata, and due to the fact that no continuous flow of rotary mud is passed through this lower chamber after the geothermometer is in place, the disturbances in equilibrium tend to disappear, thus bringing the temperature of the chamber 92 toward the true rock temperature.

It is not necessary that the geothermometer 15 be held in place until the chamber 92 has reached the true rock temperature. This true temperature may be calculated by extrapolation from the readings on the chart 36, as previously described. This method of extrapolation is particularly advantageous in the method illustrated in Fig. 8, inasmuch as the disturbances of temperature equilibrium extend some distance into the strata in the event that these strata are hard and the drilling of the bore-hole 12 slow.

The above three methods comprehended by this invention have been described as utilizing the ordinary rotary mud supply used in the drilling of wells by the rotary method, this mud ordinarily being supplied in excess of that actually required, thus increasing the penetration of thermal disturbances. However, my invention also comprehends controlling the supply of rotary mud to the well so that the cooling effect of this mud will substantially counterbalance the heat generated by the bit, this frictional heat thus generated being absorbed by the mud. Furthermore, in certain cases, it is possible, by regulating the initial temperature as well as the amount of flow of this mud, to not only have the mud rise in temperature in an amount equal to the heat developed by the bit, but also to have the final temperature of this mud, when in the lower end of the well, substantially equal to the true rock temperature at this lower end of the well. The true rock temperature at any depth may be approximated before actual measurement, especially if other wells in the vicinity have been carefully logged, and if previous temperatures of the well being drilled have been measured. By thus balancing the cooling effect of the mud against the frictional heat developed by the bit, and balancing the resulting mud temperature in the bottom of the well against the true rock temperature adjacent the point of drilling, it is possible to minimize the penetration of the disturbances in the strata. This is particularly advantageous when the method illustrated in Fig. 8 is being utilized, inasmuch as the time element required for the strata to reach equilibrium is very much decreased, if not entirely eliminated, by directly controlling the amount and temperature of the mud.

It should, however, be understood that this method of balancing temperatures in a well is equally applicable to the methods illustrated in Figs. 1 and 7. Similarly, it should be clear that even if the exact theoretical balance is not maintained, the recording device will indicate readings from which a curve asymptotic to the true rock temperature may be plotted. The accuracy obtained by the balancing of temperatures in the well is, of course, greater than that obtained without this balance, and the time element necessary is also reduced. However, my invention comprises methods such as illustrated in Figs. 1, 7, and 8 when utilized either with or without the temperature-balance system just described.

Recording devices such as the one illustrated are often affected by the temperature of the medium contacting the recording device. In this capacity, it should be noted that the mud forced downward through the drill-pipe completely surrounds the recording device 25, thus tending to maintain this device at a constant temperature. Errors which might otherwise occur in the readings thereof, are greatly reduced.

It should, of course, be understood that I am not limited to the use of a geothermometer incorporating the recording mechanism operated by a column of mercury. While I have illustrated the heat-sensitive element 53 as being a mercury bulb, and the means connecting the mercury bulb through the recording device 25 as being a column of mercury, my invention should not be limited to this particular type of apparatus.

Other types of thermometers which may be used to accomplish this purpose are a vapor-pressure recording thermometer, a resistance thermometer with Wheatstone bridge, a thermometer having thermo elements with a potentiometer, etc. In the event that it is not desired to lower a recording device into the well, this device may be located at the surface of the ground, although such a placement often introduces errors into the readings due to the great distance over which the means operatively connecting the heat-sensitive element and the recording device must operate.

It is also possible to utilize a maximum recording thermometer in place of the thermometer with the recording device. In such an apparatus it is, of course, impossible to plot a curve which is asymptotic to the true rock temperature curve, and therefore such a maximum recording thermometer will give only approximate results. If a recording thermometer is used, my invention should not be limited beyond the heat-sensitive element and the recording device, these elements being operatively connected by suitable means.

By carefully determining the true rock temperature at intervals throughout the drilling of the well, it is possible to plot these true rock temperatures as a function of the depth of the well. Such a curve will give the normal thermal gradient of the well being drilled, and a comparison of this gradient with the normal gradients of other wells in the vicinity will serve to determine the general subterranean anticlinal structure as previously described, thus indicating on what portion of this anticlinal structure the well is positioned.

I have discovered, however, that the depth-temperature curve of a given well often shows the existence of certain detailed types of formations penetrated by the bit. Thus, aside from the importance of the normal slope of this curve in determining the presence and position of large subterranean uplifts, such, for instance, as large anticlinal structures, the form of this depth-temperature curve is influenced in detail by the thermal conductivity of the strata penetrated, by their heat evolving or heat absorbing characteristics (for example beds containing organic material in which chemical or biochemical reactions may be in progress) and by the thermal history of the strata. Thus, coarse textured rocks saturated with water conduct heat much more effectively than do rocks having a lesser content of water. A water sand, therefore, is ordinarily indicated by a local flattening in the depth-temperature curve. A gas-filled sand conducts heat poorly, and tends to cause a steepening of the depth-temperature curve. Furthermore, certain organic shales are known to be actively evolving heat which results from chemical or biochemical reactions in progress therein, and the position of such a strata in a well is ordinarily marked by a pronounced "kink" or point of inflection in the depth-temperature curve.

It frequently happens in geologic history that a formation once deeply buried, and correspondingly elevated in temperature, is later uplifted, exposed by erosion, and then covered over by a deposit of geologically younger strata. In this case an unconformity or disconformity exists between the two formations, and the position of the unconformity or disconformity in the well will be indicated by a change in slope of the depth-temperature curve.

In Fig. 11 I have illustrated a portion of a depth-temperature curve plotted from the true rock-temperatures as determined by the geothermometer of my invention, or by other types of geothermometers giving accurate indications of the true rock temperatures present in the strata penetrated by the drill. I have illustrated the abscissa of this curve as indicating depth and the ordinate as indicating temperature, the numeral 100 illustrating a curve plotted on this coordinate system from the readings of the geothermometer at known depths. The slope of this curve at any point thus indicates the geothermal gradient of the well at a depth corresponding to this point on the curve. The curve illustrated rises at a fairly uniform slope to a point 101, and between this point and a point 102 the slope thereof is less, though practically constant between these points. Beyond the point 102 the curve rises at its previous gradient until a point 103 is reached, after which the gradient suddenly increases to a new value and remains at this value until a point 104 is reached. Such a curve would correctly be interpreted as follows: Between the points 101 and 102, the gradient is much less, thus indicating a local water-sand stratum, the gradient being less due to the fact that this water strata conducts heat much more effectively than other types of unsaturated strata. Ordinarily the portion between the points 103 and 104 would indicate an unconformity or disconformity, but a steepening of the gradient in other instances indicates a gas-filled sand. Whether the steepened gradient indicates an unconformity or a gas-filled sand can ordinarily be determined during the drilling by the presence or absence of gas emanating from this strata.

The types and shapes of "kinks" or points of inflection in the depth-temperature curve caused by certain organic shales are varied and are not illustrated in Fig. 10. It should be understood that the curve shown in Fig. 11 does not necessarily show the normal gradient of the well. If this graph indicates the whole depth-temperature curve, then the portions of the curve between the points 102 and 103 and prior to the point 101, would indicate this normal gradient. On the other hand, the curve illustrated may be only a small portion of the total depth-temperature curve and the normal gradient might occur beyond the point 104.

The correlation of the depth-temperature curves of a plurality of wells in a given area may thus be utilized for determining certain phases of the geologic structure underlying the area. When thus correlating the depth-temperature curves of different wells in the same vicinity, it will be found that these curves have identifiable peculiarities which may be correlated to plot the underground structure. Thus, a similar "kink" or point of inflection appearing at different depths indicated by the depth-temperature curves of a number of wells, would make possible a three-dimension plotting of the particular structure indicated by this "kink" or point of inflection. Similarly, corresponding portions of such curves having similar slopes either in amount or position can be correlated to plot the structure defining this gradient.

The use of the term "rock temperature" in the appended claims should, of course, not be limited to temperatures recorded during the drilling through rock. This term is understood in the art to be synonymous with strata temperature, and it is in this capacity that I have used the term.

Similarly, I have used the term "well" to indicate the total volume of the well. Thus, this term as applied to the method illustrated in Fig. 1 includes the bore-hole 12 and the core-hole 75; and as applied to the method illustrated in Fig. 7 includes the bore-hole 12 and the core-hole 60; while in Fig. 8 this term includes only the bore-hole 12 with its upper and lower chambers 91 and 92 formed respectively above and below the packer 90. The term "core-hole" has not necessarily been used in its conventional sense as understood in the art, but has been used to define a hole formed at the lower end of a bore-hole, whether this hole is formed by drilling, percussion, or pressure, and whether or not a core is removed from the resulting hole. The term "point of inflection" as used in this specification should not be limited to the sense in which it is used in mathematical analysis of curves wherein it often defines a point at which a curve changes from being concave in one direction to concave in an opposite direction but should be interpreted in its broadest aspect as indicating a point or segment of a curve in which a bend or angle occurs.

I claim as my invention:

1. A method of determining true rock temperatures in a well, which comprises: lowering into the lower end of a well a heat-sensitive element sealed from that portion of the well above said element; and recording the temperature of said element.

2. A method of determining true rock temperatures in a bore-hole, which comprises: lowering a heat-sensitive element a distance below the normal bottom of said bore-hole; and recording the temperature to which said heat-sensitive element is subjected.

3. In a device for recording rock temperatures, the combination of: a heat-sensitive element in the lower part of a well; sealing means for sealing said heat-sensitive element in a chamber formed by the walls of the lower end of said well; and recording means for recording the temperature in said chamber.

In testimony whereof, I have hereunto set my hand at Los Angeles, California, this 11th day of September, 1928.

LEWIS A. BOND.